Patented Oct. 28, 1952

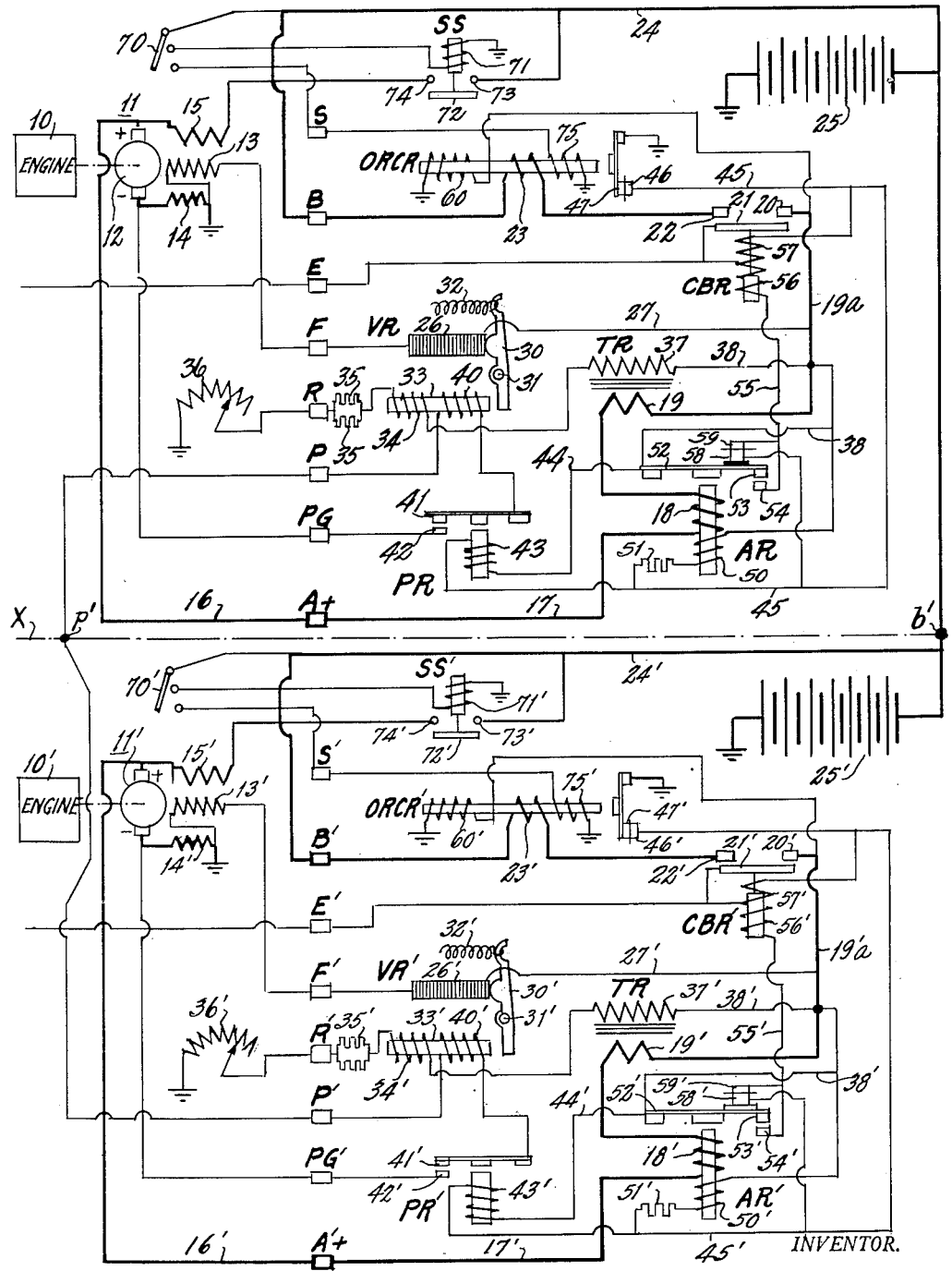

2,616,054

UNITED STATES PATENT OFFICE 2,616,054

GENERATOR CONTROL

William J. Rady, Anderson, Ind., assignor to General Motors Corporation, Detroit, Mich., a corporation of Delaware Application March 13, 1951, Serial No. 215,272

5 Claims. (Cl. 290—31)

This invention relates to the control of a dynamoelectric machine used to charge a storage battery and to furnish current for other purposes and used also as an electric motor for starting the internal combustion engine which drives it as a generator.

An object of the invention is to provide a system of control which provides for voltage regulation of the generator, for use of the generator as an engine starting motor, for prevention of battery discharge through the generator even when generator voltage drops very rapidly below battery voltage and for operation of the system with a like system of another engine-dynamo plant in the event that the state of charge of the battery of one plant is too low to crank the associated engine whereby the generator or the charged battery of the operating plant will supply current to the generator of the non-operating plant to cause the latter generator to operate as a motor to crank its engine and thereafter to operate to charge its associated battery. Two plants each having the present control system may be in parallel to charge the batteries of both plants or one battery for both plants.

More particularly it is an object of the invention to prevent the by-passing of starting field winding of the generator when it is used as a starting motor. This is accomplished by means responsive to the operation of a starter control switch for preventing operation of relay switches to close the circuit which connects the generator with the battery for battery charging.

Further objects and advantages of the present invention will be apparent from the following description, reference being had to the accompanying drawing wherein a preferred embodiment of the present invention is clearly shown.

In the drawing:

The drawing is a wiring diagram showing two like control systems which can function together to provide for the starting of the engine of one plant by current supplied by the other plant and for parallel operation of both plants if desired.

Each plant, which is capable of independent operation or of operation in parallel with another similar plant, comprises an engine 10 which drives a generator 11 having an armature 12, a shunt field winding 13, an interpole series field winding 14 and an engine starting field winding 15. The battery charging circuit, indicated by heavy lines comprises grounded winding 14, armature 12, wire 16, terminal A, wire 17, magnet coil 18 of an actuating relay AR, coil 19 of a transformer TR, wire 19a, contacts 20 and 22 bridged by a movable contact 21 of a circuit breaker relay CBR, coil 23 of an overload reverse current relay ORCR, terminal B, wire 24 and grounded battery 25.

The generator shunt field circuit comprises grounded field winding 13, terminal F, carbon pile 26 of a voltage regulator VR and wire 27 connected with wire 19a which is connected with armature 12. The voltage regulator VR has an armature lever 30 pivoted at 31 which a spring 32 urges against the pile 26 to provide minimum stack resistance when the regulator is not functioning. The control magnet of regulator VR comprises a core 33 surrounded by a generator voltage responsive coil 34 connected to ground through resistors 35, terminal R and rheostat 36. Coil 34 is connected to armature 12 through coil 37 of transformer TR and wire 38 with wire 19a.

To provide for operation of two like systems in parallel the regulator VR of each system has a magnet coil 40. Each coil 40 is connected with a terminal P. For parallel operation, the two terminals P are connected at junction p' and each coil 40 is connected with the grounded interpole winding 14 through contacts 41 and 42 of a paralleling relay PR and terminal PG. Relay PR has a magnet coil 43 connected by wire 44 and wire 38 with wire 19a. Coil 43 is connected by wire 45 with normally closed contacts 46 and 47 of relay ORCR, contact 47 being grounded. Therefore coil 43 is responsive to generator voltage. Coil 50 of relay AR is also responsive to generator voltage since it is connected with wire 19a and through resistor 51 with wire 45.

The armature 52 of relay AR carries a contact 53 (connected with wires 38 and 19a) normally separated from a contact 54 connected by wire 55 with coils 56 and 57 of relay CBR. Coil 57 is connected with wire 45. The junction of coils 56 and 57 is connected with contact 21 of relay CBR. Armature 52 of relay AR insulatingly carries a contact 58 normally engaging a contact 59, thereby normally connecting wire 55 with wire 45.

The engine 10 is started by closing switch 70 which connects the battery 25 with the magnet coil 71 of starter solenoid SS and contact 72 bridges contacts 73 and 74 to connect the battery with the starting field winding 15, the armature 12 and the field winding 14 of the generator to cause it to operate as a motor to crank the engine. When the engine is started, switch 70 is opened. When generator voltage reaches a certain value, coil 50 of relay AR is sufficiently energized to cause armature 52 to separate contacts 58, 59 and to engage contacts 53, 54. Coils 56 and 57 of relay CBR receive current and operate in assisting relation to cause contact 21 to bridge contacts 20 and 22. The battery charging circuit is then complete. Coil 18 of relay AR receives current and assists coil 50 in attracting the armature 52 to hold contacts 53, 54 in engagement although the voltage on coil 50 may vary. Coil 57 of relay CBR is directly connected by contact 22 with contact 20 and wire 19a. Therefore energization of coil 57 is not affected by the momentary opening of contacts 53 and 54 due to vibration. When contact 21 engages contacts 20 and 22 of relay CBR, coil 60 of relay ORCR receives current and bucks coil 23 so that contacts 46 and 47 remain closed.

The engine may be stopped by turning off its ignition or by closing its fuel supply if it is a diesel. As engine speed falls, generator voltage falls relatively gradually below battery voltage. Current reverses in coil 18 of relay AR and contacts 53, 54 separate and contacts 58, 59 engage and the outer ends of coils 56 and 57 of relay CBR are connected together and with ground. Concurrently therewith, through closed contacts 46 and 47 of relay ORCR current flows from the battery from contact 21 of relay CBR through coils 56 and 57 in directions such that they act in bucking relation and contact 21 separates from contacts 20 and 22 and discharge from the battery ceases.

If the drop in generator voltage should be abnormally rapid due, for example, to very sudden stopping of the engine or accidental short-circuit of the generator, the reverse current flow from the battery could occur so quickly and be so great, that relay AR would not have time to function. This abnormal reverse current flow will cause such reversal of flux by coil 23 of relay ORCR that coil 23 will immediately operate in assisting relation to coil 60 to separate contacts 46 and 47 so that relay coils 56, 57, 50 and 43 become deenergized and the battery-generator circuit is opened.

The parts of the diagram above and below line x on the drawing show the control systems for two similar engine-generator plants. Each system can operate independently of the other and can operate together by connecting them at p' and b'. For example, certain automotive vehicles may each be provided with one of these plants to furnish current for apparatus carried by the vehicle. If the storage battery 25 on a vehicle A should be so weak that the engine 10 of its plant cannot be started, another vehicle B similarly equipped is driven to the vehicle A and connections are made at p' and b' so that current can be supplied by the plant of vehicle B to start the engine on vehicle A by operating its generator 11 as a starting motor in the manner described. After the engine on vehicle A is started, its generator can operate alone or both generators can operate in parallel to recharge the battery on vehicle A.

If the generator of the aiding plant B operating at full speed and voltage supplies current to the generator of the plant A to be started to operate the latter generator as a motor for engine starting purposes, it is desirable to prevent closure of the relay AR of plant A until its generator is up to full speed and voltage for the following reason.

After the starting of the engine, there is an interval between the instant the engine speed is such that the generator is capable of producing a voltage which would cause relay AR to close its contacts 53 and 54 to cause relay CBR to connect contacts 20 and 22 and the instant the generator is up to full speed and voltage. If relay AR of plant A were permitted to operate, the starting field winding 15 would be by-passed and the generator of plant A would, during said interval, receive excessive current from the generator of plant B operating at full speed and voltage. Operation of relay AR is prevented so long as starter control switch 70 remains closed because coil 75 of relay ORCR receives current while switch 70 is closed and produces a flux causing separation of contacts 46 and 47. Therefore no current can pass through coil 50 of relay AR.

As described in the copending application of Rady and Rice Serial Number 76,824, filed February 16, 1949, which application issued on March 6, 1951 as Patent No. 2,544,179, change in current flowing in coil 19 of the transformer TR due to connecting or disconnecting current consuming devices with respect to line wire 24 induces momentarily a voltage in transformer coil 37 in such manner as to produce a stabilizing effect on the voltage regulator VR.

The relays ORCR, CBR, AR and PR, the transformer TR and the voltage regulator VR (including resistors 35) may be housed in an apparatus box of which the terminals are S, B, E, F, R, P, PG and A. Terminal E is connected with contact 21 of relay CBR so that, when this relay closes, any current consuming devices connected with terminal E will receive current when their individual control switches are closed. Rheostat 36 is preferably located outside the apparatus box in a place where it will be accessible for setting the voltage level of the voltage regulator.

While the embodiment of the present invention as herein disclosed, constitutes a preferred form, it is to be understood that other forms might be adopted.

What is claimed is as follows:

1. In a control system for battery charging and engine starting the combination comprising a storage battery, a generator having a shunt field winding for the generating function and a series field winding for the starting function, a relay having contacts for connecting the generator with the battery and a magnet coil which, when energized, effects contact closure, an energizing circuit for said magnet coil comprising two sets of contacts in series one set being normally closed and the other normally open, means responsive to application of a certain voltage across the generator armature for closing the normally open contacts to effect energization of said magnet coil to connect the generator with the battery, means for connecting the battery with the starting field winding and armature for the engine starting function and means responsive to the operation of said first means for opening the normally closed contacts of the energizing circuit of the magnet coil.

2. In a control system for battery charging and engine starting the combination comprising a storage battery, a generator having a shunt field winding for the generating function and a series field winding for the starting function, a relay having contacts for connecting the generator with the battery and a magnet coil which, when energized, effects contact closure, an energizing circuit for said magnet coil comprising two sets of contacts in series one set being normally closed and the other normally open, a second relay for closing the normally open contacts of the energizing circuit of the magnet coil of the first relay and having a first coil which becomes effective in response to a certain voltage at the generator terminals and having a second coil effective to assist said first coil while the generator receives current from the battery and effective to buck the first coil when the battery discharges to the generator, means for connecting the battery with the starting field winding and armature for the engine starting function and means responsive to the operation of said first means for opening the normally closed contacts of the energizing circuit of the magnet coil of the first relay.

3. In a control system for battery charging and engine starting the combination comprising a storage battery, a generator having a shunt field winding for the generating function and a series field winding for the starting function, a relay having contacts for connecting the generator with the battery and a magnet coil which, when energized, effects contact closure, an energizing circuit for said magnet coil comprising two sets of contacts in series one set being normally closed and the other normally open, a second relay for closing the normally open contacts of the energizing circuit of the magnet coil of the first relay and having a first coil which becomes effective in response to a certain voltage at the generator terminals and having a second coil effective to assist said first coil while the generator receives current from the battery and effective to buck the first coil when the battery discharges to the generator, means for opening the normally closed contacts of the energizing circuit of the magnet coil of the first relay in response to abnormal high rate of battery discharge to the generator, means for connecting the battery with the starting field winding and armature for the engine starting function and means responsive to the operation of said first means for opening the normally closed contacts of the energizing circuit of the magnet coil of the first relay.

4. In a control system for battery charging and engine starting the combination comprising a storage battery, a generator having a shunt field winding for the generating function and a series field winding for the starting function, a relay having contacts for connecting the generator with the battery and a magnet coil which, when energized, effects contact closure, an energizing circuit for said magnet coil comprising two sets of contacts in series one set being normally closed and the other normally open, a second relay for closing the normally open contacts of the energizing circuit of the magnet coil of the first relay and having a first coil which becomes effective in response to a certain voltage at the generator terminals and having a second coil effective to assist said first coil while the generator receives current from the battery and effective to buck the first coil when the battery discharges to the generator, an overload reverse current relay which includes the normally closed contacts of the energizing circuit of the magnet coil of the first relay and a magnet coil in the battery charging circuit which, on being energized by abnormally high rate of battery discharge, effects opening of said normally closed contacts, and which includes an auxiliary coil, and a switch for connecting the battery with the generator starting field winding and armature and with the auxiliary coil of the overload reverse current relay to effect opening of said normally closed contacts.

5. In a control system for battery charging and engine starting the combination comprising a storage battery, a generator having a shunt field winding for the generating function and a series field winding for the starting function, a relay having contacts for connecting the generator with the battery and a magnet coil which, when energized, effects contact closure, an energizing circuit for said magnet coil comprising two sets of contacts in series one set being normally closed and the other normally open, a second relay for closing the normally open contacts of the energizing circuit of the magnet coil of the first relay and having a first coil which becomes effective in response to a certain voltage at the generator terminals and having a second coil effective to assist said first coil while the generator receives current from the battery and effective to buck the first coil when the battery discharges to the generator, an overload reverse current relay which includes the normally closed contacts of the energizing circuit of the magnet coil of the first relay and three magnet coils, the first coil being across the generator terminals, the second coil being in the battery charging circuit and in bucking relation to the first coil while the battery receives current from the generator, said coil assisting the first coil to open the normally closed contacts when the battery discharges to the generator, the third coil being effective to open the normally closed contacts when connected with the battery and a switch for connecting the battery with the generator starting field winding and armature and with the third coil of the overload reverse current relay.

WILLIAM J. RADY.

REFERENCES CITED

The following references are of record in the file of this patent:

UNITED STATES PATENTS

| Number | Name | Date |
|---|---|---|
| 1,081,749 | Jones | Dec. 16, 1913 |
| 1,347,546 | Larsh | July 27, 1920 |
| 1,475,746 | Candy | Nov. 27, 1923 |
| 1,672,112 | Brotz | June 5, 1928 |
| 1,707,296 | Brotz | Apr. 2, 1929 |
| 1,812,026 | Wendt | June 30, 1931 |
| 2,063,994 | Frank et al. | Dec. 15, 1936 |
| 2,151,487 | Schaeren | Mar. 21, 1939 |
| 2,386,118 | Ihrig | Oct. 2, 1945 |
| 2,544,179 | Rady et al. | Mar. 6, 1951 |

FOREIGN PATENTS

| Number | Country | Date |
|---|---|---|
| 60,406 | Norway | Jan. 30, 1939 |
| 79,007 | Switzerland | Oct. 1, 1918 |